United States Patent
Reefman et al.

(10) Patent No.: US 8,634,445 B2
(45) Date of Patent: Jan. 21, 2014

(54) PULSE MODULATION AND DEMODULATION IN A MULTIBAND UWB COMMUNICATION SYSTEM

(75) Inventors: Derk Reefman, Best (NL); Raf L. J. Roovers, Wommelgem (BE)

(73) Assignee: NXP B.V., Eindhoven (NL)

( * ) Notice: Subject to any disclaimer, the term of this patent is extended or adjusted under 35 U.S.C. 154(b) by 1073 days.

(21) Appl. No.: 11/578,895

(22) PCT Filed: Apr. 25, 2005

(86) PCT No.: PCT/IB2005/051340
§ 371 (c)(1),
(2), (4) Date: May 4, 2009

(87) PCT Pub. No.: WO2005/107087
PCT Pub. Date: Nov. 10, 2005

(65) Prior Publication Data
US 2009/0219973 A1 Sep. 3, 2009

(30) Foreign Application Priority Data
Apr. 29, 2004 (EP) .................................. 04101808

(51) Int. Cl.
*H04B 1/00* (2006.01)
(52) U.S. Cl.
USPC ........... 375/130; 375/260; 375/150; 375/344; 375/285; 375/343; 375/347; 375/259; 375/340; 375/316; 375/261

(58) Field of Classification Search
USPC .............. 1/130, 239, 302; 375/150, 259, 260, 375/261, 285, 316, 340, 343, 344, 346, 375/347; 370/208, 209, 335, 349; 455/42, 455/113, 139, 140, 260
See application file for complete search history.

(56) References Cited

U.S. PATENT DOCUMENTS

| | | | |
|---|---|---|---|
| 6,774,859 B2 | 8/2004 | Schantz et al. | |
| 7,027,493 B2 | 4/2006 | Richards | |
| 7,079,604 B1 * | 7/2006 | Miller et al. | 375/343 |
| 7,398,068 B2 * | 7/2008 | Javor et al. | 455/140 |
| 7,532,564 B2 * | 5/2009 | Foerster et al. | 370/208 |
| 7,570,712 B2 * | 8/2009 | Welborn et al. | 375/307 |
| 2001/0033576 A1 | 10/2001 | Richards | |
| 2002/0168003 A1 | 11/2002 | Richards | |
| 2003/0090436 A1 | 5/2003 | Schantz et al. | |
| 2003/0099458 A1 * | 5/2003 | Mizukami et al. | 386/46 |
| 2003/0108133 A1 | 6/2003 | Richards | |

OTHER PUBLICATIONS

Balakrishnan J et al: "A Multi-Band OFDM System for UWB Communication"; Ultra Wideband Systems and Technologies; 2003 IEEE Conference on Nov. 16-19, 2003 pp. 354-358.

(Continued)

*Primary Examiner* — Dhaval Patel

(57) ABSTRACT

In a wireless communications system, such as a multiband Ultra Wideband communications system, data is transmitted by means of the phases of pulses in multiple frequency bands. A signal is transmitted with a predetermined phase in at least one of the frequency bands for at least a part of the time, and can be used to allow accurate detection of the phases of the signals transmitted in the other frequency bands. One of the frequency bands can be designated as a reference band, and pulses can be transmitted with constant phase in the reference band. More generally, pulses can be transmitted in the other frequency bands with phases which have a known relationship with the phases of the pulses in the reference band.

19 Claims, 2 Drawing Sheets

(56) References Cited

OTHER PUBLICATIONS

Askar, N. "General Atomics—PHY Proposal", IEEE 802.15-03/105r1 (Mar. 2003).

Medi, A. et al. "A Fully Integrated Multi-Output CMOS Frequency Synthesizer for Channelized Receivers," IEEE Int'l. Conf. on Systems-On-Chip, pp. 75-78 (Sep. 2003).

* cited by examiner

PULSE MODULATION AND DEMODULATION IN A MULTIBAND UWB COMMUNICATION SYSTEM

This invention relates to wireless communications, and in particular to a method for encoding data in a wireless communications system. More particularly, the invention relates to a system and a method for encoding data, for use in an Ultra Wideband (UWB) wireless communications system.

The term Ultra Wideband is used to refer to a number of different wireless communications systems. In one form of Ultra Wideband (UWB) communications system, a transmitter encodes data to generate a series of pulses, which are transmitted at radio frequencies. The function of the receiver is then to detect these pulses, in order to be able to extract the data from the transmitted signal.

In one particular proposed form of UWB communications system, the available bandwidth is divided into multiple bands, and data symbols are divided into multiple pulses, with the pulses making up a symbol being transmitted in different bands. The data is transmitted by encoding the data onto the phase, or polarity, of a carrier signal within each of the multiple bands. Thus, within each of the frequency bands, a pulse transmitted with a first phase, or polarity, represents a first binary value, while a pulse transmitted with a second phase, or polarity, represents a second binary value.

The document "General Atomics—PHY proposal", N. Askar, IEEE 802.15-03/105r0 outlines a system of this type.

Within the receiver in such a system, therefore, it is necessary to detect the phase of the received pulses, within each of the frequency bands, in order to be able to determine the data which is being transmitted in that band. One problem which arises with this is that it is necessary to have extremely stable, and identical, reference frequency generators in the transmitter and the receiver. In practice, it is extremely difficult to achieve this, however.

According to a first aspect of the present invention, there is provided a communications system, in which data is transmitted by means of the phases of pulses in multiple frequency bands, wherein a signal is transmitted with a predetermined phase for at least a part of the time in at least one of the frequency bands.

In one embodiment of the invention, one of the frequency bands can be designated as a reference band, and pulses can be transmitted with constant phase in the reference band. More generally, pulses can be transmitted in the other frequency bands with phases which have a known relationship with the phases of the pulses in the reference band.

In another embodiment of the invention, one of the frequency bands can be designated as a reference band, and pulses can be transmitted in the reference band with predetermined phases at predetermined time intervals.

The designated reference band may remain constant, or may change over time. More than one reference band may be designated.

The predetermination of the phase of a pulse, which is transmitted at a predetermined time in a predetermined frequency band, allows the receiver to use this as a reference for detecting the phases of other transmitted pulses.

According to a second aspect of the invention, there is provided a method of transmitting and receiving data in a multiband wireless communications system, the method comprising: in at least one reference frequency band, transmitting a series of pulses with predetermined phase; in a plurality of other frequency bands, transmitting pulses, with the phases of said pulses encoding transmitted data; and, in a receiver, decoding the pulses transmitted in the other frequency bands, wherein the pulses transmitted in the first frequency band are used as a phase reference in decoding the pulses transmitted in the other frequency bands.

In one embodiment of the invention, pulses can be transmitted with constant phase in the reference frequency band. More generally, pulses can be transmitted in the other frequency bands with phases which have a known relationship with the phases of the pulses in the reference frequency band.

In another embodiment of the invention, pulses can be transmitted in the reference frequency band with predetermined phases at predetermined time intervals.

The designated reference frequency band may remain constant, or may change over time. More than one reference frequency band may be designated.

Figure 1:
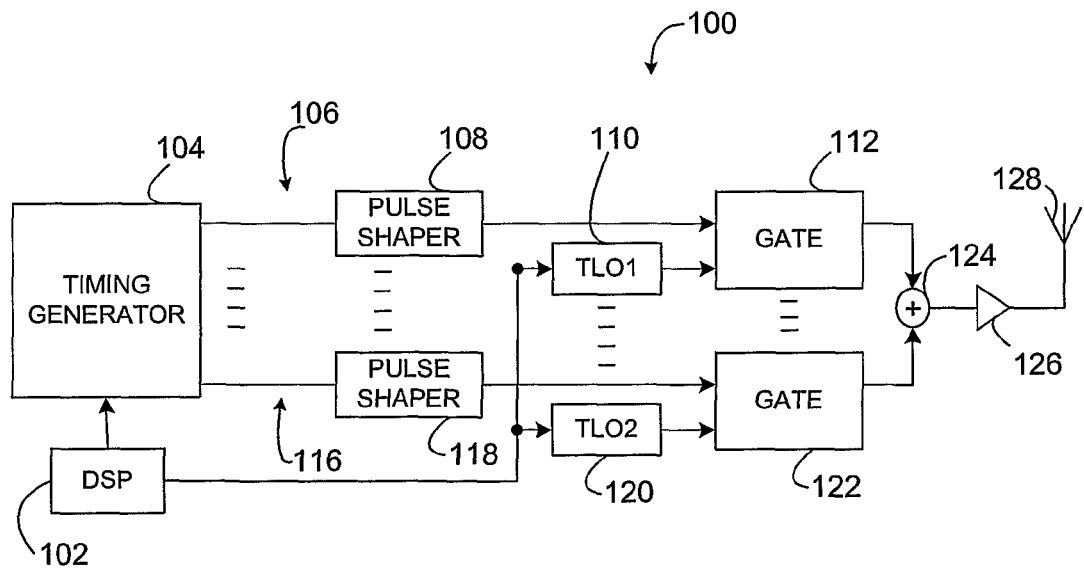
FIG. 1 is a block schematic diagram of a transmitter forming part of a radio communications system in accordance with the invention.

FIG. 1 is a block schematic diagram of a transmitter 100, forming part of a wireless communications system. In particular, the invention is described herein with particular reference to its application in a multiband Ultra Wideband (UWB) wireless communications system. A definition of UWB systems is that a signal occupies a bandwidth of more than 500 MHz, in the band from 3.1 to 10.6 GHz. In one type of UWB system, the available bandwidth is divided into multiple individual bands. In this illustrated embodiment of the invention, there are nine such bands, although the exact number can be different in different implementations of the invention.

In the transmitter illustrated in FIG. 1, the data which is to be transmitted is generated and/or processed in a digital signal processor (DSP) 102 of the transmitter 100. The data is then passed to a timing generator 104, where it is divided amongst the nine separate frequency bands. As illustrated in FIG. 1, the transmission path 106 for the first band includes a pulse shaper 108, in which a pulse is formed from the data being transmitted from the first transmission path 106. The first transmission path 106 further includes a first transmitter local oscillator (TLO1) 110, which generates a frequency in a first band of the total available bandwidth.

The pulse from the pulse shaper 108, and the first local oscillator signal from the local oscillator 110, are then supplied to a gate 112, in which the pulse is used to modulate the local oscillator signal. For example, in the case of a pulse representing a binary '1', a signal may be generated at the first local oscillator frequency with a particular phase; in the case of a pulse representing a binary '0', the gate 112 may generate a signal having the opposite phase. Other, more complex, multi-phase coding schemes are also possible.

The other transmission paths operate in the same way, although in FIG. 1 only the ninth transmission path 116 is shown, for simplicity. Thus, the data allocated for transmission in the ninth frequency band is passed to a pulse shaper 118, and the resulting pulse is combined with a local oscillator signal from a ninth transmitter local oscillator (TLO9) 120 in a gate 122, to form a signal at a frequency in the ninth band, whose polarity represents the data to be transmitted.

As is known, steps must be taken to ensure that the local oscillator frequencies TLO1-TLO9 meet the required conditions. That is, the phase and frequency differences between the local oscillator signals must be constant. For example, the local oscillator frequencies TLO1-TLO9 may all be obtained from just one standard local oscillator, with phase locked loops establishing the desired relationship between the local oscillator signals.

The signals generated by the gates in the nine transmission paths are then combined in an adder 124, and the resulting signal is amplified in a power amplifier 126, before being passed to a transmit antenna 128.

Figure 2:
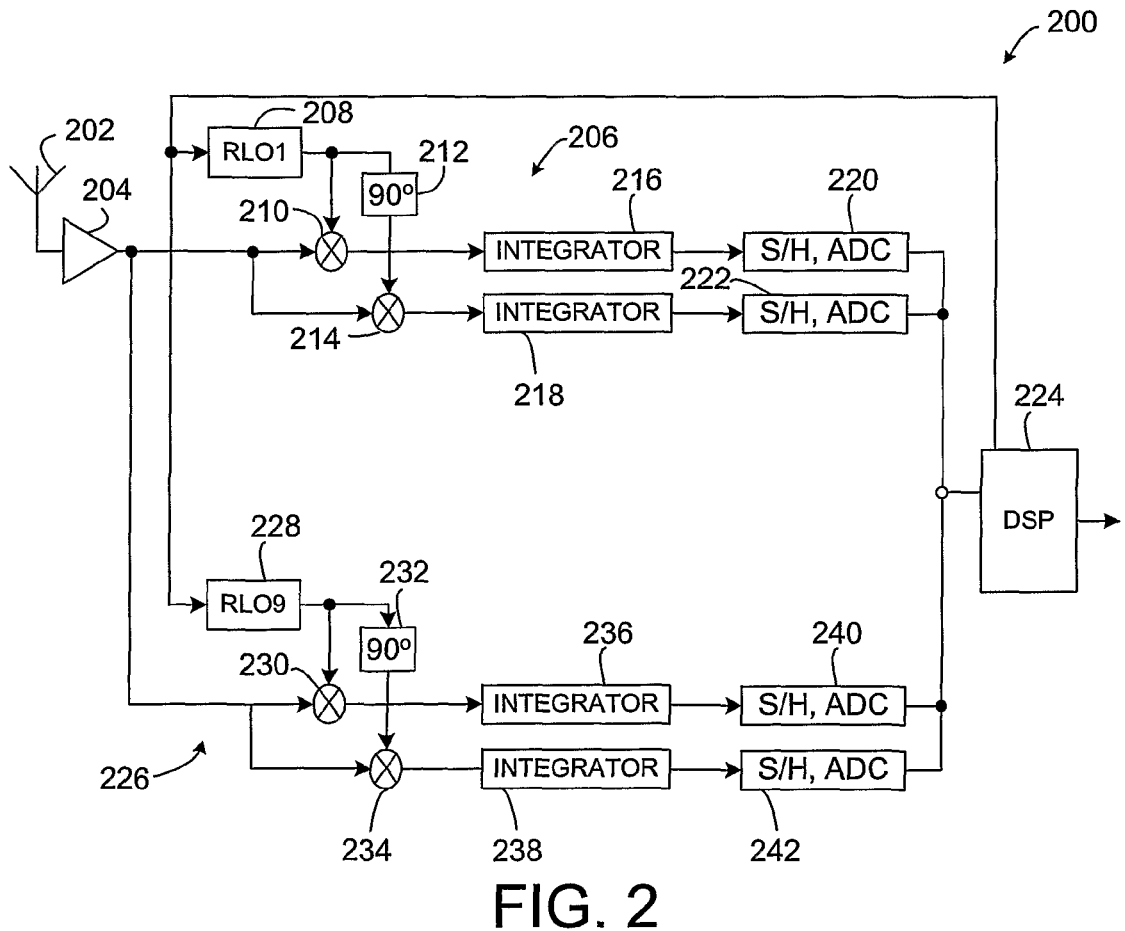
FIG. 2 is a block schematic diagram of a receiver in a system in accordance with the present invention.

FIG. 2 is a block schematic diagram showing the form of a receiver 200, adapted to receive signals transmitted from a transmitter 100 of the type shown in FIG. 1.

Signals are received at an antenna 202, and then amplified in an amplifier 204. The resulting signal, containing components in all of the frequency bands, is then passed into nine reception paths, each of which detects the signals in a respective one of those frequency bands.

Thus, in a first reception path 206, a first receiver local oscillator (RLO1) 208 generates a local oscillator signal at a frequency within the first band, and this local oscillator signal is passed to a first mixer 210, and is passed through a 90° phase shifter 212 to a second mixer 214. The mixers 210, 214 are connected to receive the received signal passed into the first reception path 206, and therefore detect the in-phase and quadrature components of that signal at the first local oscillator frequency. The in-phase and quadrature components are both detected, to avoid the possibility that the phase of the received signal is at 90° to the phase of the local oscillator signal, in which case the received signal may not be detected.

The outputs of the mixers 210, 214 are passed to respective integrators 216, 218, and the integrated outputs are passed to respective blocks 220, 222, which each perform a sample and hold function and an analog-digital conversion function. As a result of the high data rate which can be achieved in a UWB communications system, these blocks need to sample the signal at an appropriately high rate. For example, the sample period may need to be of the order of 100 ps-1 ns.

The blocks 220, 222 therefore produce respective digital outputs representing the in-phase and quadrature components of the signal at the first local oscillator frequency. These signals are then passed to a digital signal processor 224. Together, the digital outputs representing the in-phase and quadrature components of the signal at the first local oscillator frequency are a suitable measure of the signal received at that frequency.

Again, the receiver 200 contains nine such reception paths, of which only the first and the ninth are shown in FIG. 2 for the purposes of simplicity.

In the ninth reception path 226, the ninth receiver local oscillator (RLO9) 228 generates a local oscillator signal at a frequency in the ninth frequency band, and this is passed to a corresponding first mixer 230, and through a 900 phase shifter 232 to a corresponding second mixer 234. As before, the outputs of the first and second mixers 230, 234 are passed to respective integrators 236, 238, and then to blocks 240, 242 which perform sample and hold and analog-digital conversion functions.

As in the first reception path 206, therefore, the blocks 240, 242 generate digital signals representing the in-phase and quadrature components of the signal in the ninth frequency band. Again, these digital signals are passed to the digital signal processor 224.

In order to ensure that the received signals are detected correctly, it is necessary that the local oscillators RLO1-RLO9 in the receiver have frequencies, and phases, which are sufficiently close to the frequencies and phases of the local oscillators TLO1-TLO9 in the transmitter 100. Thus, as discussed above with reference to the generation of the local oscillator frequencies TLO1-TLO9 in the transmitter, steps must also be taken to ensure that the local oscillator frequencies RLO1-RLO9 meet these required conditions. As in the transmitter, for example, the local oscillator frequencies RLO1-RLO9 may all be obtained from just one standard local oscillator, with phase locked loops establishing the desired relationship between the local oscillator signals.

In accordance with this embodiment of the present invention, this is achieved by using one of the frequency bands to transmit known data. For example, in this preferred embodiment of the invention, one of the frequency bands is used to transmit a constant stream of binary '1's. This means that, when the signal is received in the receiver 200, and the digital signal processor 224 detects the transmitted signals, it can adjust the phase and/or frequency of the local oscillator signal generated by the local oscillator in that frequency band, in order to ensure that a constant stream of binary '1's is in fact detected in that reception path.

Moreover, the local oscillators in the other reception paths can be adjusted correspondingly, in order to ensure that the known frequency and phase relationship is maintained between the local oscillator in that one frequency band, and the local oscillator in the other frequency bands. In the case where there is just one standard local oscillator, with phase locked loops establishing the desired relationship between the local oscillator signals, then adjusting this standard local oscillator means that all of the local oscillators are adjusted automatically. However, as an alternative, all of the local oscillators can in principle be adjusted individually, although this is less convenient in practice.

Figure 3:
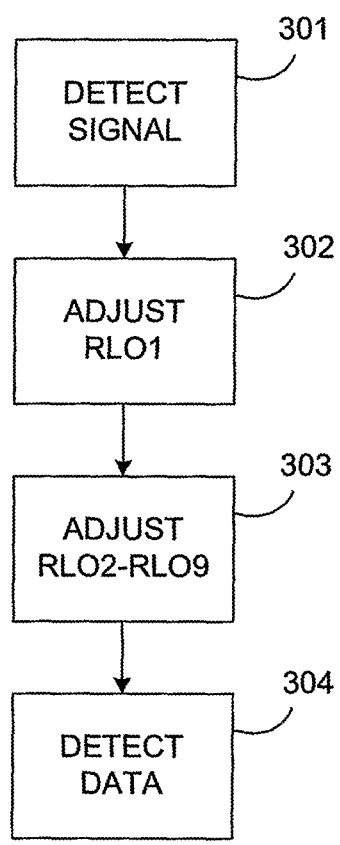
FIG. 3 is a flow chart illustrating a method of operation of the system in accordance with the invention.

FIG. 3 is a flow chart illustrating a presently preferred method of control of the local oscillators RLO1-RLO9 in the receiver 200.

In step 301 of the process, a received signal is detected. As part of the detection process, the receiver uses the predetermined information about the data transmitted in one of the frequency bands. As mentioned previously, in this illustrated embodiment of the invention, the first frequency band is selected for the transmission of the predetermined data, and specifically this frequency band is used to transmit a series of pulses, whose phases all represent data '1's, or any other known sequence.

In step 302, the phase and frequency of the local oscillator signal in this one frequency band, that is, in this illustrated embodiment the first local oscillator RLO1, are adjusted so that the receiver accurately detects a series of data '1's from the pulses transmitted in the first frequency band.

In step 303, corresponding adjustments are made to the phase and frequency of the local oscillator signal in the other frequency bands, that is, in this illustrated embodiment the local oscillators RLO2-RLO9. As mentioned above, in the preferred embodiment of the invention, all of the local oscillators are derived from a single local oscillator. Therefore, adjusting the phase and frequency of the first local oscillator RLO1 automatically causes corresponding adjustments to the other local oscillators RLO2-RLO9.

Then, in step 304, with the adjustments having been made to the local oscillators RLO2-RLO9, the data transmitted in the respective frequency bands is detected, in a generally conventional way. That is, the sample and hold and analog-digital conversion blocks, in the pairs of paths at each frequency band, produce signals representing the in-phase and quadrature components of the received signals in those frequency bands. The digital signal processor 224 then analyses these signals, to determine the polarity of the pulses transmitted in the frequency bands, and thus to extract the data transmitted by those pulses. This data can then be used to reconstruct the original data sequence.

The invention is described herein with reference to an embodiment in which one of the frequency bands is designated as a reference band, and pulses can be transmitted with constant phase in the reference band. More generally, pulses can be transmitted in the other frequency bands with phases which have a known relationship with the phases of the pulses in the reference band.

In another embodiment of the invention, one of the frequency bands can be designated as a reference band, and pulses can be transmitted in the reference band with predetermined phases at predetermined time intervals. Any adjustments can then be made in the receiver to maintain the correct phase and frequency relationships, when one of those pulses is transmitted. The predetermined time intervals can be chosen such that the adjustments are made sufficiently often to maintain the required detection accuracy.

The designated reference band may remain constant, or may change over time. Also, more than one reference band may be designated.

The invention is also described herein with reference to an embodiment in which the transmitted data is detected by adjusting the phases and/or frequencies of the local oscillators in the receiver. However, embodiments of the invention are also possible, in which the necessary adjustments are made in the digital domain. That is, the digital signal processor 224 may be adapted to be able to adjust the signals received from the blocks 220, 222, 240, 242 etc. Specifically, the digital signal processor 224 may be adapted to determine the adjustments which would be required in order to accurately detect the pulses of known phase in the designated reference band. From this determination, the digital signal processor 224 can also make corresponding adjustments to the digital signals derived from the signals received in the other frequency bands, and can then use the adjusted signals to detect the phases of the pulses received in those other frequency bands.

Thus, the system and method described herein allow the accurate detection of the transmitted data. The effect is that one of the frequency bands is unavailable for data transmission for at least a part of the time, since it is used to transmit known data during that time, namely, in the illustrated embodiment of the invention, a constant stream of binary '1's. However, the arrangement has the advantage that the requirements imposed on the frequency generation are greatly reduced. That is, any moderate variation in the local oscillators within the transmitter can be compensated in the receiver. Further, there is a reduced requirement for absolute frequency accuracy in the local oscillators within the receiver.

The invention claimed is:

1. A communications system comprising:
   a transmitter configured to:
   form pulses from data to be transmitted;
   generate local oscillator signals in multiple frequency bands, wherein differences in phase and frequency between the local oscillator signals are constant;
   modulate the local oscillator signals with the pulses to generate signals in the multiple frequency bands; and
   transmit the generated signals in the multiple frequency bands, wherein a signal in one of the multiple frequency bands is modulated with pulses from known data and has a predetermined phase, wherein the transmitter is configured to transmit data in the multiple frequency bands by means of polarity of the pulses in the multiple frequency bands, pulses in the one of the multiple frequency bands having a predetermined polarity, the predetermined polarity being used to detect pulses in signals in others of the multiple frequency bands.

2. A communications system as claimed in claim 1, wherein the one of the frequency bands is designated as a reference band, and the transmitter is further configured to transmit signals in the other frequency bands with phases which have a known relationship with the predetermined phase in the reference band.

3. A communications system as claimed in claim 2, wherein the transmitter is further configured to transmit a signal with constant phase in the reference band.

4. A communications system as claimed in claim 2, wherein the transmitter is further configured to transmit a signal in the reference band with predetermined phases at predetermined time intervals.

5. A communications system as claimed in claim 2, wherein the designated reference band remains constant or changes over time.

6. A communications system as claimed in claim 1, wherein the communications system is an Ultra Wideband wireless communications system, the communications system further comprising:
   a receiver configured to:
   receive the signals in the multiple frequency bands;
   use the known data to adjust phase and frequency of a receiver side local oscillator signal for the one of the multiple frequency bands; and
   adjust phases and frequencies of other receiver side oscillator signals for others of the multiple frequency bands based on the differences in phase and frequency between the local oscillator signals.

7. A method of transmitting and receiving data in a multi-band wireless communications system, the method comprising:
   in a transmitter:
   forming pulses from data to be transmitted;
   generating local oscillator signals in multiple frequency bands, wherein differences in phase and frequency between the local oscillator signals are constant;
   modulating the local oscillator signals with the pulses to generate signals in the multiple frequency bands; and
   transmitting the generated signals in the multiple frequency bands from the modulated local oscillator signals, wherein a signal in one of the multiple frequency bands is modulated with pulses from known data and has a predetermined phase, wherein transmitting the generated signals in the multiple frequency bands from the modulated local oscillator signals comprises transmitting data in the multiple frequency bands by means of polarity of the pulses in the multiple frequency bands, pulses in the one of the multiple frequency bands having a predetermined polarity, the predetermined polarity being used to detect pulses in signals in others of the multiple frequency bands.

8. A method as claimed in claim 7, comprising transmitting pulses in said plurality of other frequency bands with phases which have a known relationship with the phases of the pulses in the first frequency band.

9. A method as claimed in claim 7, comprising transmitting a signal with constant phase in the one of the multiple frequency bands.

10. A method as claimed in claim 7, comprising transmitting a signal in the one of the multiple frequency bands with predetermined phases at predetermined time intervals.

11. A method as claimed in claim 7, wherein the one of the multiple frequency bands remains constant.

12. A method as claimed in claim 7, wherein the one of the multiple frequency bands changes over time.

13. A method as claimed in claim 7 further comprising transmitting signals having predetermined phases at predetermined time intervals on one or more of the multiple frequency bands.

14. A method as claimed in claim 7, wherein the communications system is an Ultra Wideband wireless communications system, the method further comprising:
in a receiver:
receiving the signals in the multiple frequency bands;
using the known data to adjust phase and frequency of a receiver side local oscillator signal for the one of the multiple frequency bands; and
adjusting phases and frequencies of other receiver side oscillator signals for others of the multiple frequency bands based on the differences in phase and frequency between the local oscillator signals.

15. A transmitter, for use in a multiband wireless communications system, the transmitter comprising:
means for forming pulses from data to be transmitted;
frequency generators, for generating local oscillator signals at a plurality of frequencies in respective frequency bands;
a plurality of modulators, for generating modulated signals from said pulses at said plurality of frequencies;
wherein said plurality of modulators are adapted to generate a modulated signal having a predetermined phase at a first of said plurality of frequencies for at least a part of the time, and to generate modulated signals at others of said plurality of frequencies, wherein the modulated signals have phases that have a known relationship to the predetermined phase at the first of said plurality of frequencies, wherein the transmitter is configured to transmit data in the multiple frequency bands by means of polarity of the pulses in the multiple frequency bands, pulses in the one of the multiple frequency bands having a predetermined polarity, the predetermined polarity being used to detect pulses in signals in others of the multiple frequency bands.

16. A transmitter as claimed in claim 15, wherein said frequency generators comprise a single local oscillator reference frequency generator, and means for generating said local oscillator signals at said plurality of frequencies in respective frequency bands therefrom.

17. A receiver, for use in a multiband wireless communications system, the receiver comprising:
means for receiving modulated signals transmitted at multiple frequency bands, one of the modulated signals carrying known data and having a predetermined phase;
frequency generators, for generating local oscillator signals at a plurality of frequencies in the multiple frequency bands;
means for adjusting phases of the local oscillator signal;
wherein, the means for adjusting phases is configured to use said known data to adjust phase and frequency of a corresponding one of the local oscillator signals and to adjust phases and frequencies of other local oscillator signals based on constant phase and frequency differences between the local oscillator signals, wherein data is transmitted in the multiple frequency bands by means of polarity of the pulses in the multiple frequency bands, pulses in the one of the multiple frequency bands having a predetermined polarity, and wherein the receiver is configured to use the predetermined polarity to detect pulses in signals in others of the multiple frequency bands.

18. A receiver as claimed in claim 17, wherein said frequency generators comprise a single local oscillator reference frequency generator, and means for generating said local oscillator signals at said plurality of frequencies in respective frequency bands therefrom.

19. A receiver as claimed in claim 18, comprising means for adjusting a frequency and/or phase of said signals at others of said plurality of frequencies, based on the adjusted phase and frequency of the corresponding one of the local oscillator signals.

* * * * *